US010706825B2

(12) United States Patent
Tripathi et al.

(10) Patent No.: US 10,706,825 B2
(45) Date of Patent: Jul. 7, 2020

(54) TIMESTAMP BASED DISPLAY UPDATE MECHANISM

(71) Applicant: Apple Inc., Cupertino, CA (US)

(72) Inventors: Brijesh Tripathi, Los Altos, CA (US); Arthur L. Spence, San Jose, CA (US); Joshua P. de Cesare, Campbell, CA (US); Ilie Garbacea, Santa Clara, CA (US); Guy Cote, San Jose, CA (US); Mahesh B. Chappalli, San Jose, CA (US); Malcolm D. Gray, Sunnyvale, CA (US); Christopher P. Tann, San Jose, CA (US)

(73) Assignee: Apple Inc., Cupertino, CA (US)

( * ) Notice: Subject to any disclaimer, the term of this patent is extended or adjusted under 35 U.S.C. 154(b) by 730 days.

(21) Appl. No.: 14/869,148

(22) Filed: Sep. 29, 2015

(65) Prior Publication Data

US 2017/0092236 A1   Mar. 30, 2017

(51) Int. Cl.
*G09G 5/39*   (2006.01)
*G09G 5/395*   (2006.01)
(Continued)

(52) U.S. Cl.
CPC ............ *G09G 5/395* (2013.01); *G06F 3/1407* (2013.01); *G06F 3/147* (2013.01);
(Continued)

(58) Field of Classification Search
CPC .......... G09G 5/393; G09G 5/39; G09G 5/363; G09G 5/395; G06T 1/60
(Continued)

(56) References Cited

U.S. PATENT DOCUMENTS 5,253,078 A   10/1993   Balkanski et al.
5,537,650 A    7/1996   West et al.
(Continued)

FOREIGN PATENT DOCUMENTS

EP   2211510 B1   8/2011
EP   2428878 A2   3/2012
WO   2014032385 A1   3/2014

OTHER PUBLICATIONS

International Search Report and Written Opinion in International Application No. PCT/US2016/043394, dated Oct. 4, 2016, 13 pages.
(Continued)

*Primary Examiner* — Gordon G Liu
(74) *Attorney, Agent, or Firm* — Kowert Hood Munyon Rankin and Goetzel PC; Rory D. Rankin

(57) ABSTRACT

Systems, apparatuses, and methods for implementing a timestamp based display update mechanism. A display control unit includes a timestamp queue for storing timestamps, wherein each timestamp indicates when a corresponding frame configuration set should be fetched from memory. At pre-defined intervals, the display control unit may compare the timestamp of the topmost entry of the timestamp queue to a global timer value. If the timestamp is earlier than the global timer value, the display control unit may pop the timestamp entry and fetch the frame next configuration set from memory. The display control unit may then apply the updates of the frame configuration set to its pixel processing elements. After applying the updates, the display control unit may fetch and process the source pixel data and then drive the pixels of the next frame to the display.

20 Claims, 12 Drawing Sheets

(51) Int. Cl.
*G06F 3/14* (2006.01)
*G06F 3/147* (2006.01)

(52) U.S. Cl.
CPC . *G09G 2310/08* (2013.01); *G09G 2340/0407* (2013.01); *G09G 2340/0464* (2013.01); *G09G 2360/127* (2013.01)

(58) Field of Classification Search
USPC .......................................................... 345/531
See application file for complete search history.

(56) References Cited

U.S. PATENT DOCUMENTS

| | | | |
|---|---|---|---|
| 5,615,376 | A | 3/1997 | Ranganathan |
| 6,011,546 | A | 1/2000 | Bertram |
| 6,298,370 | B1 | 10/2001 | Tang et al. |
| 6,938,176 | B1 | 8/2005 | Alben et al. |
| 8,117,481 | B2 | 2/2012 | Anselmi et al. |
| 8,767,777 | B2 | 7/2014 | Kobayashi |
| 8,823,721 | B2 * | 9/2014 | Vasquez ................ G09G 5/003 345/531 |
| 9,116,639 | B2 | 8/2015 | Tripathi |
| 2008/0212729 | A1 | 9/2008 | Shaanan |
| 2009/0196209 | A1 | 8/2009 | Haartsen |
| 2010/0237847 | A1 | 9/2010 | Finney |
| 2011/0169848 | A1 * | 7/2011 | Bratt ..................... G09G 5/363 345/545 |
| 2011/0292059 | A1 | 12/2011 | Kobayashi |
| 2011/0299512 | A1 | 12/2011 | Fukuda |
| 2012/0068994 | A1 | 3/2012 | Li et al. |
| 2012/0207208 | A1 | 8/2012 | Wyatt et al. |
| 2012/0317607 | A1 | 12/2012 | Wyatt et al. |
| 2013/0021352 | A1 | 1/2013 | Wyatt et al. |
| 2013/0057511 | A1 | 3/2013 | Shepelev et al. |
| 2013/0136412 | A1 * | 5/2013 | Lee ..................... H04M 3/4878 386/230 |
| 2013/0305074 | A1 | 11/2013 | Ellis et al. |
| 2013/0314429 | A1 | 11/2013 | Croxford et al. |
| 2014/0071062 | A1 | 3/2014 | Fang |
| 2014/0173313 | A1 | 6/2014 | Tripathi et al. |
| 2014/0292787 | A1 | 10/2014 | Tripathi et al. |
| 2015/0098020 | A1 | 4/2015 | Vill |
| 2015/0348496 | A1 | 12/2015 | Santos, II et al. |
| 2015/0355762 | A1 | 12/2015 | Tripathi et al. |

OTHER PUBLICATIONS

International Search Report and Written Opinion from PCT/US2013/075665, dated May 19, 2014, 10 pages.
Wiley, Craig, "eDP™ Embedded DisplayPort™: The New Generation Digital Display Interface for Embedded Applications", DisplayPort Developer Conference, Dec. 6, 2010, 30 pages.
International Search Report and Written Opinion in International Application No. PCT/US2015/030731, dated Aug. 31, 2015, 10 pages.
Holland, et al., U.S. Appl. No. 14/500,570, entitled "Reduced Frame Refresh Rate", filed Sep. 29, 2014, 44 pages.
Holland, et al., U.S. Appl. No. 14/676,565, entitled "Managing Back Pressure During Compressed Frame Writeback for Idle Screens", filed Apr. 1, 2015, 50 pages.

* cited by examiner

TIMESTAMP BASED DISPLAY UPDATE MECHANISM

BACKGROUND

Technical Field

Embodiments described herein relate to the field of graphical information processing and more particularly, to display update mechanisms.

Description of the Related Art

Part of the operation of many computer systems, including portable digital devices such as mobile phones, notebook computers and the like, is to employ a display device to display images, video information/streams, and data. Accordingly, these systems typically incorporate functionality for generating images and data, including video information, which are subsequently output to the display device. Such devices typically include video graphics circuitry (i.e., a display control unit) to process images and video information for subsequent display.

In digital imaging, the smallest item of information in an image is called a "picture element," more generally referred to as a "pixel." For convenience, pixels are generally arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices are interpreted as a succession of ordered image frames, or frames for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store the pixels for image and video frame information. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size. The High-Definition Television (HDTV) format, for example, is composed of up to 1080 rows of 1920 pixels per row, or almost 2.1M pixels per frame.

Typically, raw video is received by a device (e.g., an integrated circuit (IC), such as a system-on-a-chip (SOC), or a package such as a multi-chip module (MCM)) of a computer system in a format that is not directly compatible with the electronic display to which a display control unit of the device outputs frames to be displayed. In addition, the display control unit may not accept the raw video format as input. Thus, at least some processing of input video may be performed by the device to convert the video input into a display-compatible format before outputting the video frames to the electronic display for viewing. For example, the device may be used to convert the video input from a raw video format (e.g., YUV420/1080p) to electronic display (e.g., ARGB) format frames of an appropriate size for viewing prior to feeding the video frames to the display control unit. The display control unit may perform additional rendering of the frames prior to feeding the frames to the electronic display.

In addition, there may be other parameters associated with a given frame or set of frames that may be used by the device for processing and displaying the frames on the electronic display. For example, brightness and/or contrast levels may vary dependent upon user inputs or as an intended part of a video stream. One or more video input streams and one or more of these other parameters may be input for display concurrently. Some parameters may not be embedded within a video stream and, therefore, require synchronization with the video stream to display the images as intended. Synchronizing various parameters to a video source and determining when to update the display control unit with new parameters is challenging.

SUMMARY

Systems, apparatuses, and methods for implementing display update mechanisms are contemplated.

In one embodiment, an apparatus may include a display control unit which may be configured to receive and process source pixel data and drive destination frames to one or more displays. The display control unit may also be configured to fetch or receive frame configuration sets for adjusting the various settings of the display control unit. In various embodiments, the display control unit may include at least pixel processing logic and control logic. The control logic may include a timestamp queue and a shadow First-In-First-Out (FIFO) buffer with a plurality of entries for storing frame configuration sets. The timestamp queue may store timestamps corresponding to desired presentation times of destination frames.

In various embodiments, the display control unit may be configured to fetch frame configuration sets based on the times indicated in corresponding timestamps, wherein each frame configuration set corresponds to one or more of the destination frames. In various embodiments, each frame configuration set may include a header and one or more commands. The display control unit may also be configured to store each frame configuration set in entries of the shadow FIFO. In response to determining that the time indicated in the top entry of the timestamp queue has been reached, the display control unit may be configured to retrieve the next frame configuration set. In one embodiment, the address of the next frame configuration set may be stored in the top entry of the timestamp queue.

In one embodiment, the apparatus may include one or more host processors for executing software to manage the apparatus. The software may be configured to receive and/or generate requests for frames to be driven to the display. In response to a request to display a frame, the software may generate a frame configuration set to update the display control unit settings for processing the source pixel data of the frame. The software may also generate a timestamp with the desired display time for displaying the frame. The software may send the timestamp with an address of the frame configuration set to the timestamp queue of the display control unit.

In one embodiment, at selected intervals, the display control unit may compare the timestamp from the top entry of the timestamp queue to a global timer value. If the timestamp is earlier than the global timer value, then the display control unit may pop the top entry of the timestamp queue and fetch the frame configuration set using the address from the popped entry. The display control unit may store the frame configuration set in the shadow FIFO, drain the frame configuration set to the configuration registers, and then update the settings of the display control unit using the parameters and commands of the frame configuration set. Next, the display control unit may fetch the source pixel data of the next frame from memory and process and drive the pixels to the display.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
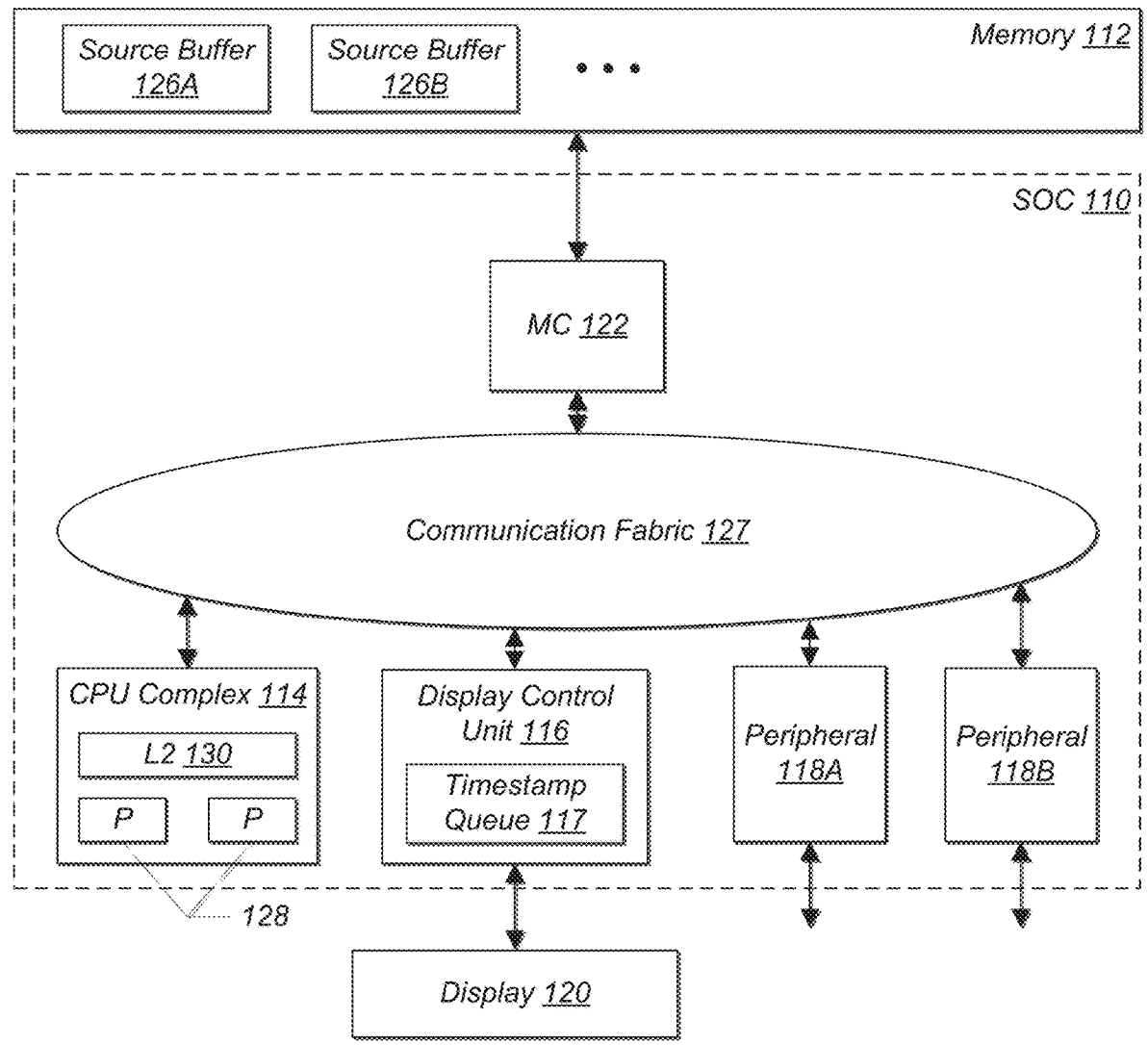
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, display control unit 116, peripheral components 118A-118B (more briefly, "peripherals"), a memory controller (MC) 122, and a communication fabric 127. The components 114, 116, 118A-118B, and 122 may all be coupled to the communication fabric 127. The memory controller 122 may be coupled to the memory 112 during use. Similarly, the display control unit 116 may be coupled to the display 120 during use. In the illustrated embodiment, the CPU complex 114 includes one or more processors 128 and a level two (L2) cache 130.

The display control unit 116 may include hardware to process one or more still images and/or one or more video sequences for display on the display 120. Generally, for each source still image or video sequence, the display control unit 116 may be configured to generate read memory operations to read the source pixel data representing respective portions of the frame/video sequence from the memory 112 through the memory controller 122.

The display control unit 116 may be configured to perform any type of processing on the image data (still images, video sequences, etc.). In one embodiment, the display control unit 116 may be configured to scale still images and to dither, scale, and/or perform color space conversion on their respective portions of frames of a video sequence. The display control unit 116 may be configured to blend the still image frames and the video sequence frames to produce output frames for display. Display control unit 116 may also be referred to as a display pipe, display pipeline, or a display controller. A display control unit may generally be any hardware configured to prepare a frame for display from one or more sources, such as still images and/or video sequences.

More particularly, display control unit 116 may be configured to retrieve respective portions of source frames from one or more source buffers 126A-126B stored in the memory 112, composite frames from the source buffers, and display the resulting frames on corresponding portions of the display 120. Source buffers 126A and 126B are representative of any number of source frame buffers which may be stored in memory 112. Accordingly, display control unit 116 may be configured to read the multiple source buffers 126A-126B and composite the image data to generate the output frame.

In various embodiments, display control unit 116 may include timestamp queue 117 for storing timestamps generated by software executing on CPU processors 128 of CPU complex 114. In one embodiment, timestamp queue 117 may be a First-In First-Out buffer (FIFO). Each timestamp stored in the timestamp queue 117 may refer to the time at which a corresponding frame should be displayed on the display 120. Display control unit 116 may include logic for comparing a timestamp to a global timer value. If the timestamp at the top of the timestamp queue 117 matches or is earlier than the global timer value, then display control unit 116 may be configured to fetch a frame configuration set associated with the corresponding frame. Display control unit 116 may then use the frame configuration set to configure the pixel processing elements of display control unit 116. After configuring the pixel processing elements, display control unit 116 may fetch, process, and display the pixels of the corresponding frame. It is noted that while the description discusses popping an entry from the top of the queue, in various embodiments other data structures may be used. For example, a search of a data structure could be performed to determine an oldest element stored in the data structure, and then the oldest element may be retrieved from the data structure. Timestamp queue 117 is representative of any suitable type of data structure, buffer, or memory for storing timestamps. Additionally, the phrase "pop the top entry" may be defined more generally as removing or invalidating the top (or oldest) element or entry from the data structure (e.g., in a data structure such as a queue, elements may be enqueued or pushed onto the bottom of the queue, and dequeued or popped from the top of the queue).

On a given interval, display control unit 116 may compare the timestamp from the top entry of timestamp queue 117 to a global timer value. In one embodiment, the interval may be based on the maximum refresh rate of the display. If the timestamp is earlier than the global timer value, then the display control unit 116 may pop the top entry of timestamp queue 117 and fetch a frame configuration set using the address from the popped entry. Display control unit 116 may store the frame configuration set in a shadow FIFO, and when the entire configuration set has been received (which may be indicated by an end of configuration marker), display control unit 116 may apply the settings of the frame configuration set to the pixel processing elements. Then, display control unit 116 may fetch the source pixel data of the next frame from one or more of source buffers 126A-B, process the source pixel data using the pixel processing elements, and drive the processed pixels to display 120.

In one embodiment, display control unit 116 may operate in one of two modes for managing the frame duration of frames being driven to the display 120. In the first mode, display control unit 116 may update the display at a fixed rate and the timestamp queue 117 may not be used. In some embodiments, the first mode may be utilized on startup of the host system or apparatus. In the second mode, display control unit 116 may utilize the timestamps in timestamp queue 117 for determining when to update display 120 with new frames.

The display 120 may be any sort of visual display device. The display 120 may be a liquid crystal display (LCD), light emitting diode (LED) or organic light emitting diode (OLED), plasma, cathode ray tube (CRT), etc. The display 120 may be integrated into a system including the SOC 110 (e.g. a smart phone or tablet) and/or may be a separately housed device such as a computer monitor, television, or other device. Various types of source image data may be shown on display 120. In various embodiments, the source image data may represent a video clip in a format, such as, for example, Moving Pictures Expert Group-4 Part 14 (MP4), Advanced Video Coding (H.264/AVC), High Efficiency Video Coding (H.265/HEVC) or Audio Video Interleave (AVI). Alternatively, the source image data may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG).

In some embodiments, the display 120 may be directly connected to the SOC 110 and may be controlled by the display control unit 116. That is, the display control unit 116 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display control unit 116 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasma interface, a cathode ray tube (CRT) interface, any proprietary display interface, etc.

The CPU complex 114 may include one or more CPU processors 128 that serve as the CPU of the SOC 110. CPU processors 128 may execute the main control software of the system, such as an operating system. Generally, software executed by the CPU processors 128 during use may control the other components of the system to realize the desired functionality of the system. The CPU processors 128 may also execute other software, such as application programs, user interface software, and a display driver. The application programs may provide user functionality, and may rely on the operating system for lower level device control. Accordingly, the CPU processors 128 may also be referred to as application processors. The CPU complex 114 may further include other hardware such as the L2 cache 130 and/or an interface to the other components of the system (e.g., an interface to the communication fabric 127).

The CPU processors 128 may execute display driver software for controlling the settings of display control unit 116 and determining the timing of destination frames being driven to display 120. In various embodiments, the display driver may receive requests from the user interface, GPU, or other processes for displaying a destination frame on display 120. In response to receiving a request, the display driver may prepare a frame configuration set for configuring display control unit 116 so as to process the source pixel data which will be used to generate the destination frame. The display driver may store the frame configuration set at a specific address. The display driver may also generate a timestamp indicative of the desired presentation time of the destination frame and then convey the timestamp and the address of the frame configuration set to display control unit 116. In one embodiment, the timestamp may include an offset value to account for the processing delay of display control unit 116. In another embodiment, display control unit 116 may compensate for the processing delay an offset value when comparing the timestamp to a timer value. Display control unit 116 may utilize the timestamp to determine when to fetch the frame configuration set from the specified address. Display control unit 116 may apply the settings in the frame configuration set to the pixel processing pipelines and then process the source pixel data to generate destination frame pixels and drive the destination frame pixels to the display at the desired presentation time.

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals 118A-118B may include audio peripherals such as microphones, speakers, interfaces to microphones and speakers, audio processors, digital signal processors, mixers, etc. The peripherals 118A-118B may include interface controllers for various interfaces external to the SOC 110 including interfaces such as Universal Serial Bus (USB), peripheral component interconnect (PCI) including PCI Express (PCIe), serial and parallel ports, etc. The peripherals 118A-118B may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
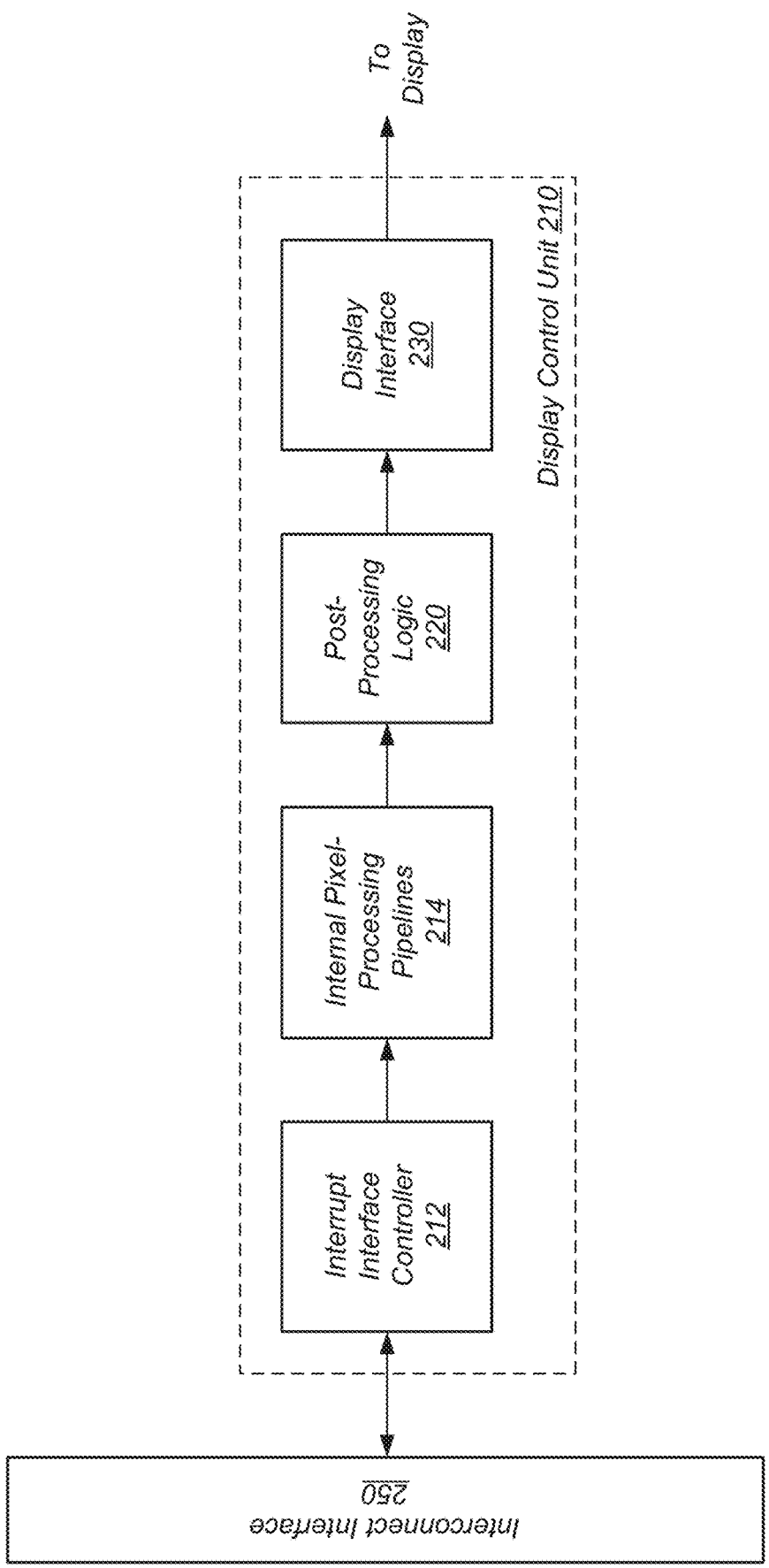
FIG. 2 is a block diagram of one embodiment of a display control unit for use in a SOC.

Turning now to FIG. 2, a generalized block diagram of one embodiment of a display control unit for use in a SoC is shown. Although one display control unit is shown, in other embodiments, the host SOC (e.g., SOC 110) may include multiple display control units. Generally speaking, display control unit 210 may be configured to process a source image and send rendered graphical information to a display (not shown).

Display control unit 210 may be coupled to interconnect interface 250 which may include multiplexers and control logic for routing signals and packets between the display control unit 210 and a top-level fabric. The interconnect interface 250 may correspond to communication fabric 127 of FIG. 1. Display control unit 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display control unit 210 may include one or more internal pixel-processing pipelines 214. The internal pixel-processing pipelines 214 may include one or more ARGB (Alpha, Red, Green, Blue) pipelines for processing and displaying user interface (UI) layers. In some embodiments, internal pixel-processing pipelines 214 may include blending circuitry for blending graphical information before sending the information as output to post-processing logic 220. The internal pixel-processing pipelines 214 may also include one or more pipelines for processing and displaying video content such as YUV content. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution.

The display control unit 210 may include post-processing logic 220. The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
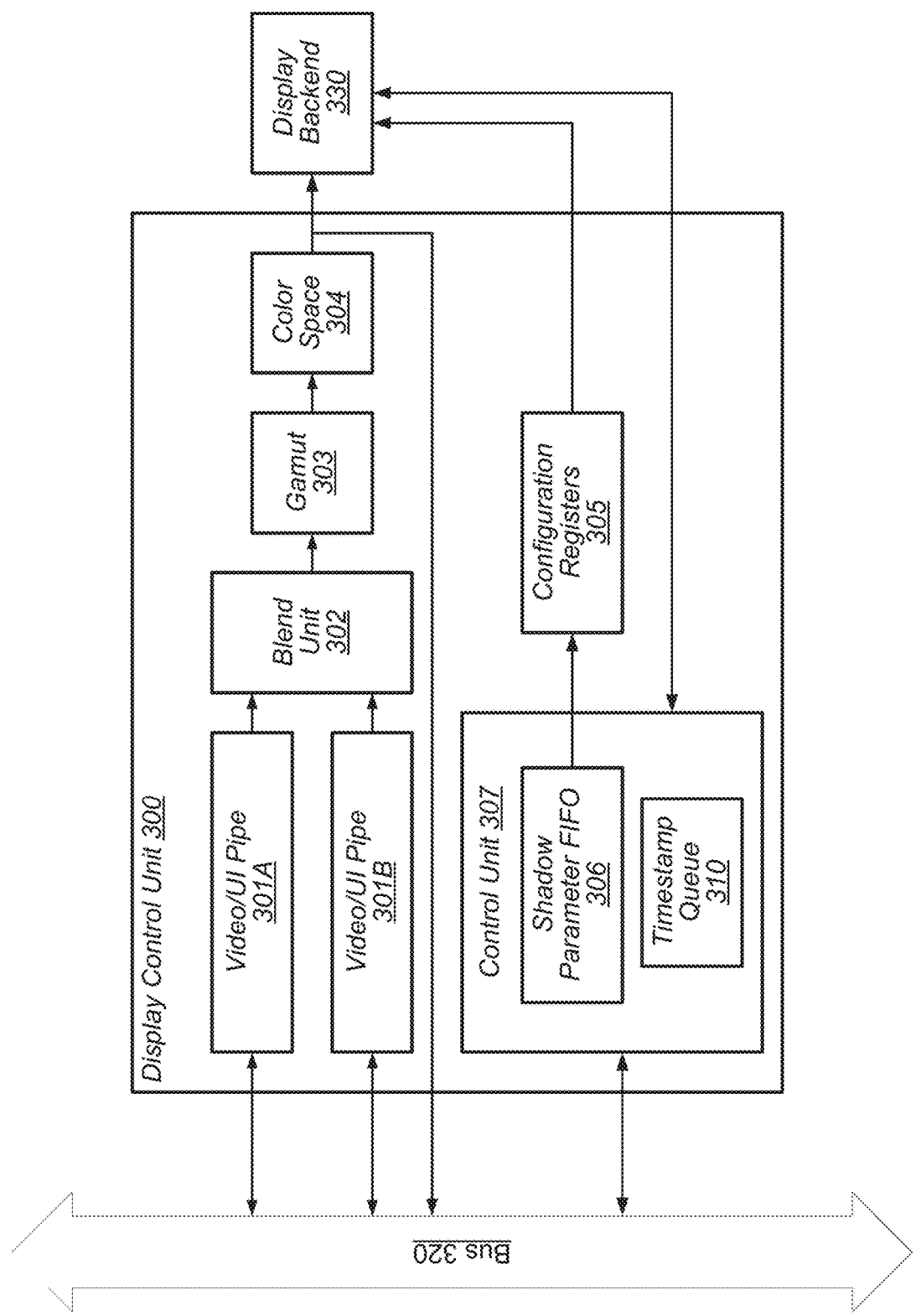
FIG. 3 is a block diagram illustrating one embodiment of a display control unit.

Referring now to FIG. 3, a block diagram of one embodiment of a display control unit 300 is shown. Display control unit 300 may represent the frontend portion of display control unit 116 of FIG. 1. Display control unit 300 may be coupled to a system bus 320 and to a display backend 330. In some embodiments, display backend 330 may directly interface to the display to display pixels generated by display control unit 300. Display control unit 300 may include functional sub-blocks such as one or more video/user interface (UI) pipelines 301A-B, blend unit 302, gamut adjustment block 303, color space converter 304, configuration registers 305, and control unit 307. Control unit 307 may include at least shadow parameter First-In First-Out buffer (FIFO) 306 and timestamp queue 310. Display control unit 300 may also include other components which are not shown in FIG. 3 to avoid cluttering the figure.

System bus 320, in some embodiments, may correspond to communication fabric 127 from FIG. 1. System bus 320 couples various functional blocks such that the functional blocks may pass data between one another. Display control unit 300 may be coupled to system bus 320 in order to receive video frame data for processing. In some embodiments, display control unit 300 may also send processed video frames to other functional blocks and/or memory that may also be coupled to system bus 320. It is to be understood that when the term "video frame" is used, this is intended to represent any type of frame, such as an image, that can be rendered to the display.

The display control unit 300 may include one or more video/UI pipelines 301A-B, each of which may be a video and/or user interface (UI) pipeline depending on the embodiment. It is noted that the terms "video/UI pipeline" and "pixel processing pipeline" may be used interchangeably herein. In other embodiments, display control unit 300 may have one or more dedicated video pipelines and/or one or more dedicated UI pipelines. Each video/UI pipeline 301 may fetch a source image (or a portion of a source image) from a buffer coupled to system bus 320. The buffered source image may reside in a system memory such as, for example, system memory 112 from FIG. 1. Each video/UI pipeline 301 may fetch a distinct source image (or a portion of a distinct source image) and may process the source image in various ways, including, but not limited to, format conversion (e.g., YCbCr to ARGB), image scaling, and dithering. In some embodiments, each video/UI pipeline may process one pixel at a time, in a specific order from the source image, outputting a stream of pixel data, and maintaining the same order as pixel data passes through.

In one embodiment, when utilized as a user interface pipeline, a given video/UI pipeline 301 may support programmable active regions in the source image. The active regions may define the only portions of the source image to be processed and displayed. In an embodiment, the given video/UI pipeline 301 may be configured to only fetch data within the active regions. Outside of the active regions, dummy data with an alpha value of zero may be passed as the pixel data.

Figure 4:
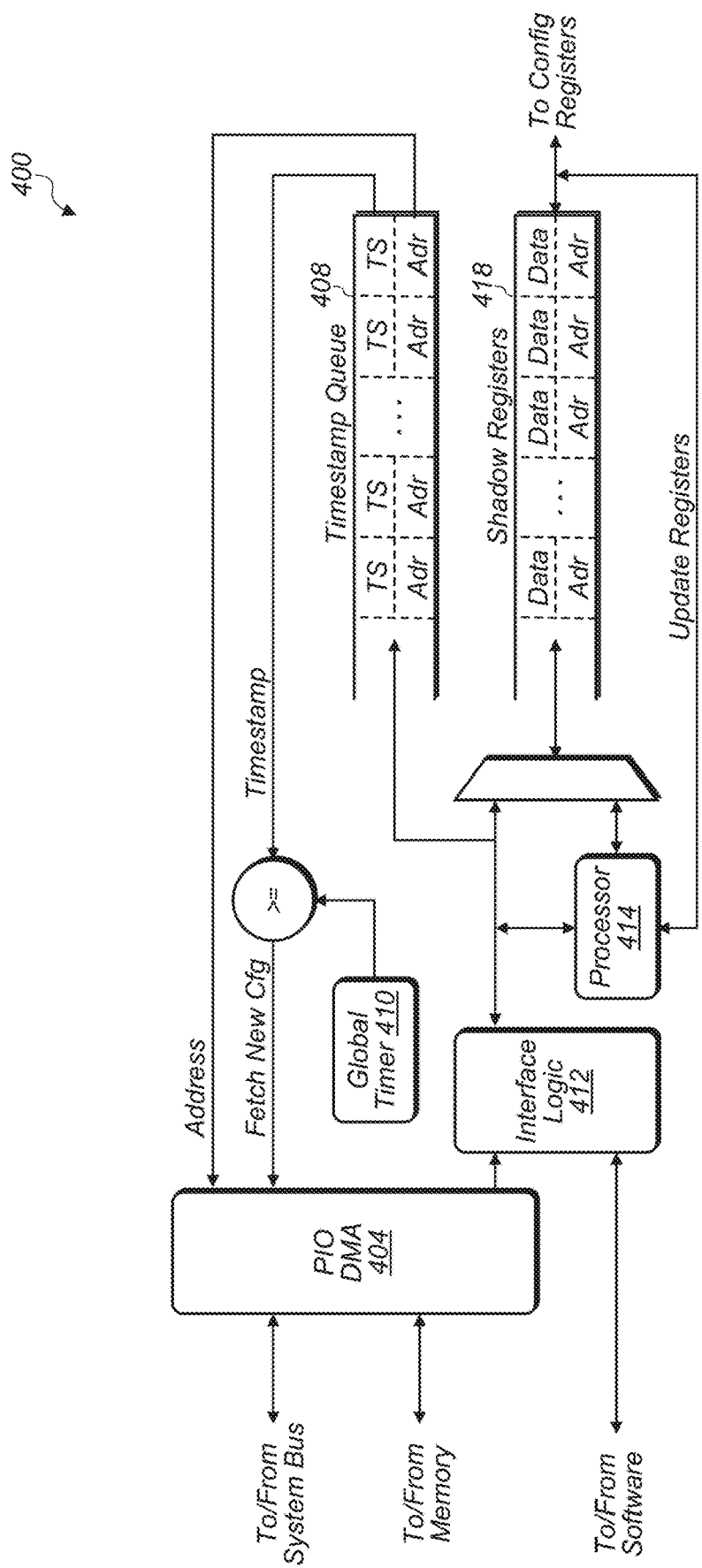
FIG. 4 is a block diagram illustrating one embodiment of a control unit within a display control unit.

In one embodiment, control unit 307 may include timestamp queue 310 and associated logic (not shown) for controlling the timing of fetching of configuration data associated with frames to be displayed on the display. A more detailed example of a control unit is shown in FIG. 4 and will be described in more detail below. In various embodiments, control unit 307 may also be configured to arbitrate read requests to fetch data from memory from video/UI pipelines 301A-B. In some embodiments, the read requests may point to a virtual address. A memory management unit (not shown) may convert the virtual address to a physical address in memory prior to the requests being presented to the memory. In some embodiments, control unit 307 may include a dedicated state machine or sequential logic circuit. In other embodiments, a general purpose processor executing program instructions stored in memory may be utilized to perform the functions of control unit 307.

Blending unit 302 may receive a pixel stream from one or more of video/UI pipelines 301A-B. If only one pixel stream is received, blending unit 302 may simply pass the stream through to the next sub-block. However, if more than one pixel stream is received, blending unit 302 may blend the pixel colors together to create an image to be displayed. In various embodiments, blending unit 302 may be used to transition from one image to another or to display a notification window on top of an active application window. For example, a top layer video frame for a notification (e.g., a calendar reminder) may need to appear on top of an internet browser window. The calendar reminder may comprise some transparent or semi-transparent elements in which the browser window may be at least partially visible, which may require blending unit 302 to adjust the appearance of the browser window based on the color and transparency of the calendar reminder. The output of blending unit 302 may be a single pixel stream composite of the one or more input pixel streams.

The output of blending unit 302 may be sent to gamut adjustment unit 303. Gamut adjustment 303 may adjust the color mapping of the output of blending unit 302 to better match the available color of the intended target display. The output of gamut adjustment unit 303 may be sent to color space converter 304. Color space converter 304 may take the pixel stream output from gamut adjustment unit 303 and convert it to a new color space. Color space converter 304 may then send the pixel stream to display backend 330 or back onto system bus 320. In other embodiments, the pixel stream may be sent to other target destinations. For example, the pixel stream may be sent to a network interface for example. In some embodiments, a new color space may be chosen based on the mix of colors after blending and gamut corrections have been applied. In further embodiments, the color space may be changed based on the intended target display.

Display backend 330 may control the display to display the pixels generated by display control unit 300. In one embodiment, display backend 330 may read pixels from an output FIFO (not shown) of display control unit 300 according to a pixel clock. The rate may depend on the resolution of the display as well as the frame refresh rate. For example, a display having a resolution of N×M and a refresh rate of R frames per second (fps) may have a pixel clock frequency based on N×M×R. On the other hand, the output FIFO may be written to as pixels are generated by display control unit 300.

Display backend 330 may receive processed image data as each pixel is processed by display control unit 300. Display backend 330 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display backend 330.

The parameters that display control unit 300 may use to control how the various sub-blocks manipulate the video frame may be stored in configuration registers 305. These registers may include, but are not limited to setting the base address, frame refresh rate, input and output frame sizes, active regions of frames, input and output pixel formats, location of the source frames, destination of the output (display backend 330 or system bus 320), a type of rotation to be performed on the frame, and other parameters. Configuration registers 305 may be loaded by shadow parameter FIFO 306.

Shadow parameter FIFO 306 may be loaded by a host processor, a direct memory access unit, a graphics processing unit, or any other suitable processor within the computing system. In other embodiments, control unit 307 may directly fetch values from a system memory (e.g., system memory 112 of FIG. 1) for populating shadow parameter FIFO 306. In various embodiments, shadow parameter FIFO 306 may store commands for updating configuration registers 305. The commands may be stored in data structures referred to as frame configuration sets or frame packets. Each frame configuration set may include settings for one or more configuration registers 305. Shadow parameter FIFO 306 may be configured to update configuration registers 305 of display processor 300 before each source video frame is fetched. In some embodiments, shadow parameter FIFO 306 may update all configuration registers 305 for each frame. In other embodiments, shadow parameter FIFO 306 may be configured to update subsets of configuration registers 305 including all or none for each frame. In some embodiments, a given frame configuration set may also include settings for display backend 330 and/or for registers outside of display control unit 300. A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display control unit 300 illustrated in FIG. 3 is merely an example. In other embodiments, different functional blocks and different configurations of functional blocks may be possible depending on the specific application for which the display control unit is intended. For example, more than two video/UI pipelines may be included within a display control unit in other embodiments.

Turning now to FIG. 4, a block diagram of one embodiment of a control unit 400 is shown. In various embodiments, control unit 307 (of FIG. 3) may include the logic of control unit 400. Control unit 400 may include a programmed input/output (PIO) direct memory access (DMA) unit 404 for retrieving frame configuration sets from memory. Control unit 400 may also include timestamp queue 408 for storing timestamps received from a display driver (or other software) executing on one or more host processors. Control unit 400 may also include shadow registers 418 for storing frame configuration sets. Shadow registers 418 may also be referred to as a shadow parameter FIFO. Control unit 400 may also include global timer 410, interface logic 412, and processor 414. Depending on the embodiment, processor 414 may be a microcontroller, programmable logic (e.g., FPGA), application-specific integrated circuit (ASIC), or any suitable combination of hardware and software. It is noted that control unit 400 as shown in FIG. 4 is representative of one possible arrangement of logic for implementing a control unit. Other suitable arrangements of logic may be utilized in other embodiments.

In one embodiment, control unit 400 may compare the top entry of timestamp queue 408 to global timer 410 once every given interval. The duration of the given interval may be programmable and/or pre-defined, depending on the embodiment. The duration of the given interval may be set based on the maximum frame refresh rate of the display. In one embodiment, the given interval may be less than or equal to half of the frame duration corresponding to the maximum frame refresh rate of the display. In one embodiment, a pre-defined interval may be programmed based on the maximum frame refresh rate for the display of the host apparatus or system. In one embodiment, the pre-defined interval may be half the frame duration of the maximum frame refresh rate of the display. For example, if the highest refresh rate for a given display is 120 Hz, then the frame duration at the highest refresh rate is 8.33 milliseconds (ms). Therefore, in this example, the pre-defined interval may be 4.167 ms, which is half of the minimum possible frame duration. For other maximum frame refresh rates, other pre-defined intervals may be utilized.

Every pre-defined interval, control unit 400 may compare the timestamp from the top entry of timestamp queue 408 to a global timer value. An offset value may be added to global timer 410 to account for the delay in fetching the frame configuration set, applying the changes to the display control unit settings, and processing the source pixel data. The sum of global timer 410 and the offset value may be referred to as the global timer value. If the timestamp in the top entry of timestamp queue 408 is less than (i.e., earlier) or equal to the global timer value, then control unit 400 may pop the top entry from timestamp queue 408 and fetch a new frame configuration set from memory. Control unit 400 may use the address in the popped entry to retrieve the new frame configuration set from memory. If the timestamp in the top entry of timestamp queue 408 is greater than (i.e., later) the global timer value, then control unit 400 may wait until another pre-defined interval has elapsed to perform the next comparison. Additionally, if the timestamp in the top entry of timestamp queue 408 is later the global timer value, control unit 400 may cause the current frame to be extended or refreshed during the next pre-defined interval duration. Similarly, if timestamp queue 408 is empty, then control unit 400 may cause the current frame to be extended or refreshed until timestamp queue 408 receives a new timestamp entry.

In one embodiment, processor 414 may program PIO DMA unit 404 to fetch a given frame configuration set from memory using an address retrieved from a popped entry of timestamp queue 408. Generally, a DMA operation is a transfer of data from a source to a target that is performed without involvement from a host processor. In various embodiments, the source of the given frame configuration set may be a system memory (e.g., memory 112 of FIG. 1) or an internal memory in the host SoC (e.g., SoC 110). For example, a peripheral component 118A-B may include a memory that may be a source of the given frame configuration set.

When a new frame configuration set is fetched from memory, the frame configuration set may be written to shadow registers 418. When a complete frame configuration set is fetched and stored in shadow registers 418, an end of configuration marker may be stored in shadow registers 418 to indicate the end of the frame configuration set. When the end of configuration marker has been stored in shadow registers 418, shadow registers 418 may be drained to the configuration registers (not shown) and then corresponding updates may be applied to the various settings of the display control unit. After the settings of the display control unit have been updated, the pixel data of the frame may be fetched from memory, processed, and then displayed.

In one embodiment, control unit 400 may operate in two different modes. In this embodiment, a first mode may be used during system bootup. In the first mode, timestamp queue 408 and processor 414 may not be used. Rather, a display driver executing on one or more host processors may send frame configuration sets to control unit 400 and frames may be displayed at a constant, fixed interval. In the second mode, processor 414 may manage the frame duration utilizing timestamp queue 408 after system bootup is complete. Timestamp queue 408 may be sized to store any number of timestamp entries, depending on the embodiment. Similarly, shadow registers 418 may be sized to store any number of frame configuration sets, depending on the embodiment. In some cases, timestamp queue 408 may be empty while operating in the second mode. When timestamp queue 408 is empty, the current frame may be repeated for as long as timestamp queue 408 is empty. In cases where the display driver determines that a new frame should be displayed immediately while timestamp queue 408 contains at least one entry, the display driver may send a reset signal to control unit 400 to reset timestamp queue 408 and write a new entry to timestamp queue 408. In one embodiment, a timestamp value of zero may be used to indicate the new frame should be displayed at the earliest opportunity.

If the same destination frame is being displayed for an indefinite period of time, then timestamp queue 408 may be empty for this period of time. For example, a user may be viewing the same email for several seconds without scrolling or changing the view on the screen. During this time when the display is not changing, software may not send any new timestamps to timestamp queue 408. When processor 414 detects that timestamp queue 408 is empty, the current destination frame may be extended or refreshed as needed. In other scenarios, the display may be changing but the frame configuration settings may remain the same. In these scenarios, the frame configuration set may consist of a single end of configuration marker.

Figure 5:
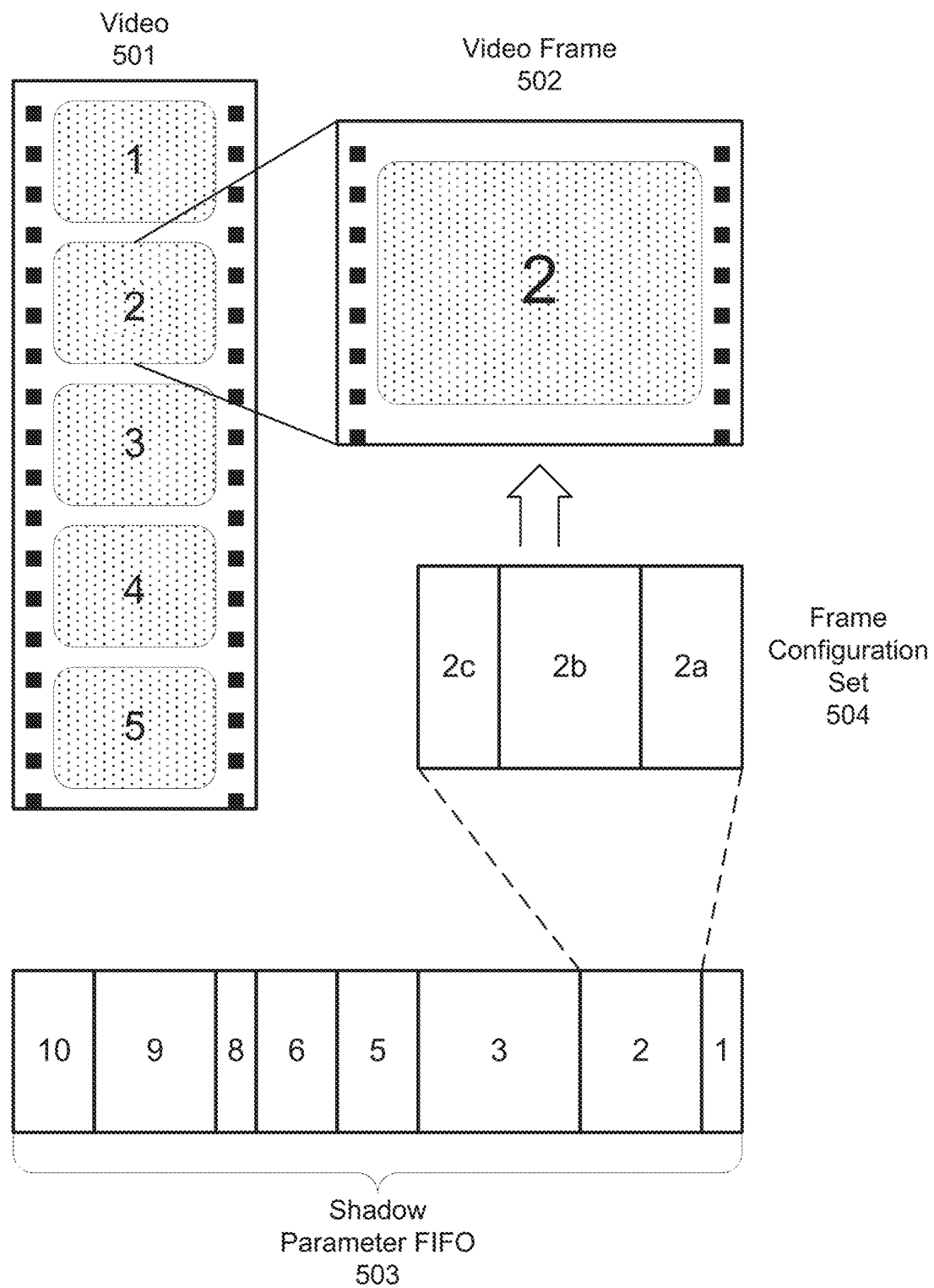
FIG. 5 illustrates one embodiment of a representation of a video file and a corresponding shadow parameter FIFO.

Referring now to FIG. 5, a representation of a video file and a corresponding shadow parameter FIFO are shown. In various embodiments, video 501 may represent a file containing a video clip in a format, such as, for example, Moving Pictures Expert Group-4 Part 14 (MP4), Advanced Video Coding (H.264/AVC), High Efficiency Video Coding (H.265/HEVC), Audio Video Interleave (AVI), or other format. Alternatively, video 501 may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), Portable Networks Graphics (PNG), or other format. For demonstration purposes, video 501 is illustrated with five frames, numbered 1 through 5. However, any number of frames may be included in video 501.

Video frame 502 may represent a single frame from video 501. In this example, video frame 502 is illustrated as frame number 2 of video 501. Video frame 502 may be a single image, in any of the formats previously discussed or any other suitable format. Video frame 502 may contain a list of pixel information in ARGB, YCbCr, or other suitable pixel format.

Shadow parameter FIFO 503 may correspond to shadow parameter FIFO 306 (of FIG. 3) or shadow registers 418 (of FIG. 4) and may have functionality as previously described. For demonstration purposes, shadow parameter FIFO 503 is illustrated in FIG. 5 as holding eight frame configuration sets, numbered 1 through 10, with 4 and 7 excluded. However, shadow parameter FIFO 503 may hold as many frame configuration sets as allowed by the size of the FIFO and the size of the frame configuration sets. The number of the frame configuration set may correspond to the number of the video frame of video 501 for which the frame configuration set is intended to be used. Frame configuration sets 4 and 7 (not shown) are excluded to illustrate that some video frames may not require a frame configuration set. In other embodiments, a frame configuration set may be required for each video frame. The size of each of the frame configuration sets is shown to vary among the 10 examples to illustrate that the sizes may differ from frame configuration set to frame configuration set. In other embodiments, each frame configuration set may be a standard consistent size.

Frame configuration set 504 may represent a single frame configuration set stored in shadow parameter FIFO 503. Frame configuration set 504 may contain settings for various registers associated with a given video frame. In this example, frame configuration set 504 is shown as number 2 which may correspond to video frame 502, also illustrated as number 2. Frame configuration set 504 is illustrated as being divided into three sections, labeled 2a, 2b, and 2c, each representing one parameter command. A given frame configuration set may include any number of parameter commands, from zero to as many as may be stored in shadow parameter FIFO 503. Each parameter command 2a-2c may contain a setting for one or more registers associated with video frame 502. Parameter commands 2a-2c may be of various lengths, based on the number of settings included in each command. In other embodiments, parameter commands 2a-2c may be standardized to one or more specific lengths.

In a system such as SOC 110 in FIG. 1, display control unit 116 may process respective portions of video frame 502 and frame configuration set 504 such that parameter commands 2a-2c are executed after video frame 1 of video 501 has been displayed and before video frame 502 is displayed, such that video frame 502 is displayed with parameters corresponding to parameter commands 2a-2c. These parameters may remain at their set values until another parameter command is executed that changes their currently set value. In some embodiments, the values of some or all parameters may be modified by commands not associated with shadow parameter FIFO 503, such as, for example, commands transmitted by processor(s) 128 of FIG. 1.

Figure 6:
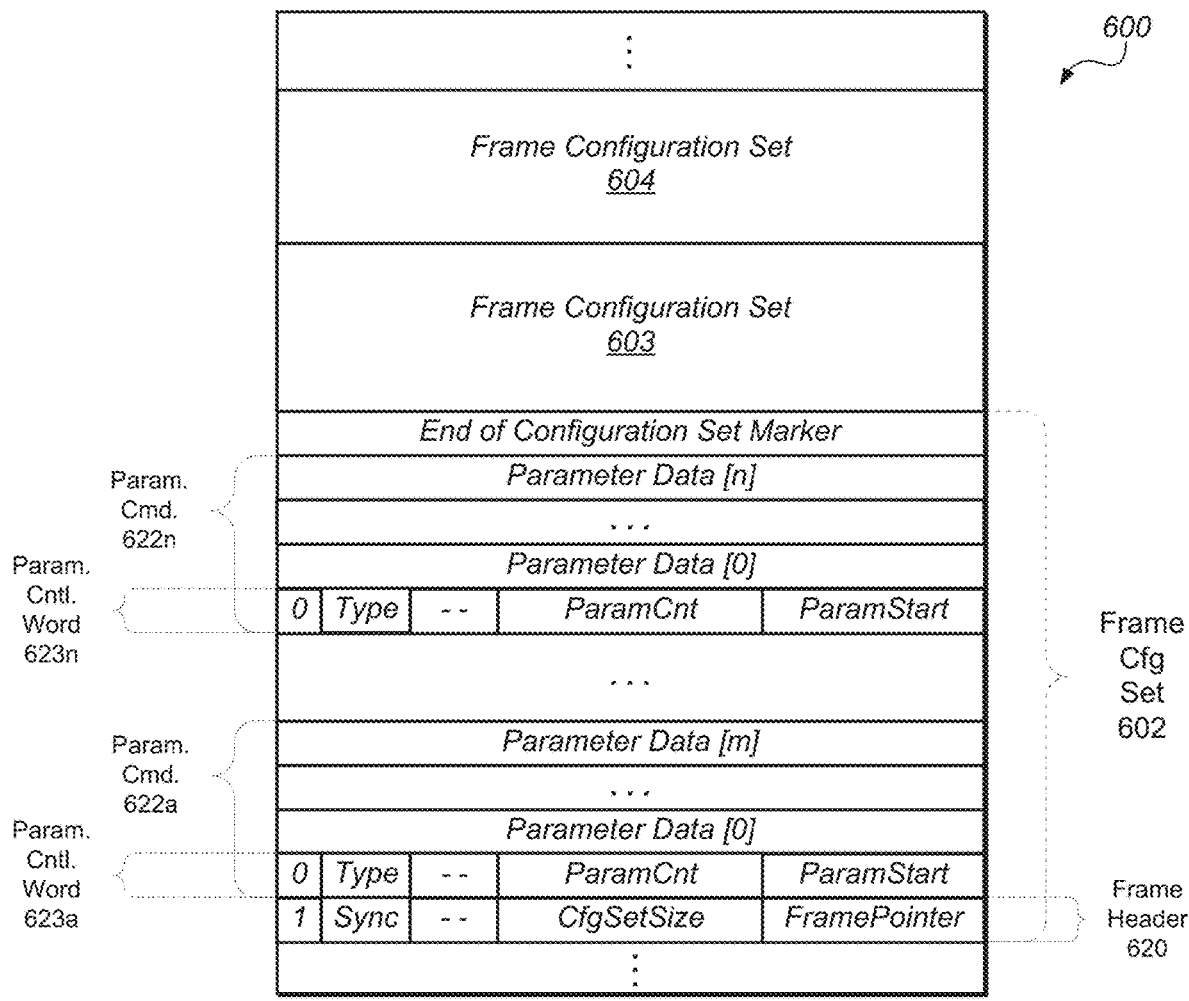
FIG. 6 illustrates one embodiment of shadow parameter FIFO entries.

Turning now to FIG. 6, one embodiment of shadow parameter FIFO entries 600 are shown. FIG. 6 illustrates the entries in a shadow parameter FIFO, such as shadow parameter FIFO 503 in FIG. 5. Shadow parameter FIFO entries 600 may include several frame configuration sets, as illustrated by frame configuration sets 602, 603, and 604.

Frame configuration set 602 may, in some embodiments, include frame header 620 and be followed by a number of parameter commands, such as parameter command 622a through parameter command 622n as depicted in FIG. 6. A given frame configuration set may contain zero parameter commands up to the maximum number of commands that may fit into a FIFO of a given size. A frame configuration set with zero parameter commands may be referred to as a null parameter setting. Frame configuration set 602 may be read from shadow parameter FIFO 503 when all frame configuration sets written to shadow parameter FIFO 503 before frame configuration set 602 have been read. When frame configuration set 602 is read, the first word read may be frame header 620.

Frame header 620 may contain information regarding the structure of frame configuration set 602. For example, frame header 620 may include a value corresponding to the size of frame configuration set 602. In some embodiments, the size may represent the number of bytes or words in the frame configuration set 602 and, in other embodiments, the size may represent the number of parameter commands. Frame header 620 may also include a value corresponding to the video frame for which it is intended. In various embodiments, frame header 620 may include a value to indicate that it is a frame header and/or a value to indicate frame configuration set 602 should be used with the next video frame to be processed rather than a specific video frame. This last feature may be useful in cases where a user adjusts a setting while a video is playing or an image is being displayed. For example, a user may change a brightness setting or a zoom factor with an expectation of the change being implemented as soon as possible rather than at a specific video frame.

Frame configuration set 602 may include zero or more parameter commands 622a-n. In some embodiments, a given parameter command, such as, for example, parameter command 622a, may include one parameter control word 623a. The parameter control word may define the structure of parameter command 622a. For example, parameter control word 623a may include a parameter count value to indicate how many parameter settings are included in the command. Parameter control word 623a may also include a parameter start value to indicate a starting register address for the parameter settings to be written. Some embodiments may also include a type value to indicate if parameter command 622a is internal, i.e., intended for registers within the display control unit, such as display control unit 116, or external, i.e., intended for registers outside display control unit 116. In some embodiments, the parameter start value may only be used for internal parameter commands, where the registers may be addressed with an address value smaller than a complete data word. In such embodiments, external commands may use the first one or more words of the parameter data to form a starting address for the register(s) to be written with the remaining parameter data.

Each parameter setting within parameter command 622a may include one or more words of parameter data, shown in FIG. 6 as parameter data [0] through parameter data [m]. The number of parameter data words included in parameter command 622a may depend on the type of parameter command, internal or external, and the number of registers to be written by parameter command 622a. In various embodiments, parameter commands 622 may include various numbers of parameter data or may be standardized to a specific number of parameter data.

It is noted that the descriptions of frame configuration sets, video frames and the shadow parameter FIFO in FIG. 5 and FIG. 6 are merely examples. In other embodiments, the structure of a frame configuration set may include multiple words for a header rather than the single word as illustrated in FIG. 6, and a header may not be the first word within a given frame configuration set. In various embodiments, frame configuration sets and parameter commands may be of a fixed length rather than various lengths as illustrated in FIGS. 5 and 6.

Figure 7:
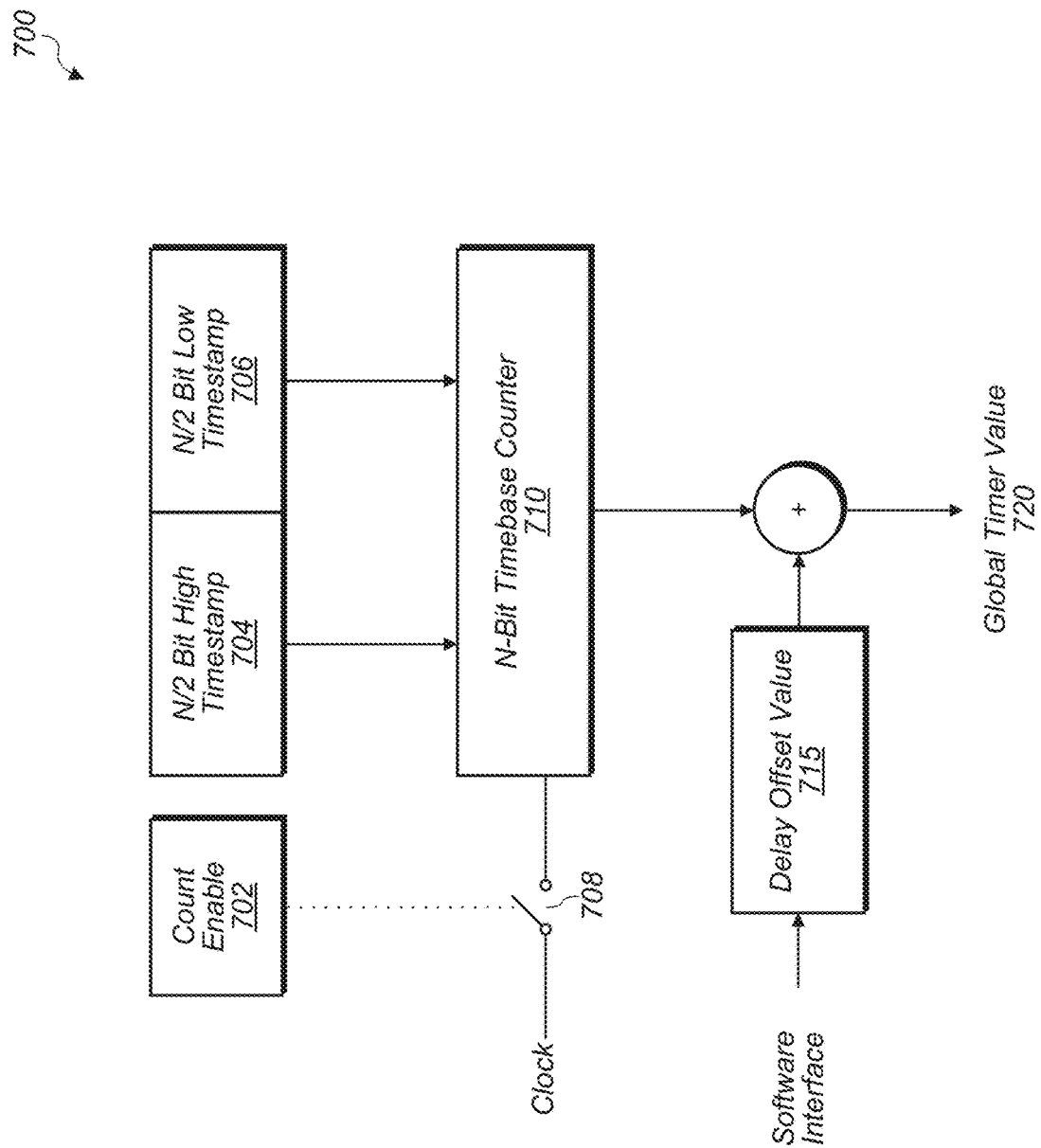
FIG. 7 is a block diagram of one embodiment of a global timer.

Referring now to FIG. 7, a block diagram of one embodiment of a global timer 700 is shown. In one embodiment, global timer 410 (of FIG. 4) of control unit 400 may include the logic of global timer 700. Global timer 700 may include an N-bit timebase counter 710, wherein 'N' is a positive even integer which may vary from embodiment to embodiment. Timebase counter 710 may be incremented by a clock which is coupled via switch 708 to timebase counter 710. The clock frequency may vary according to the embodiment. Switch 708 may be controlled by a count enable 702 signal which activates global timer 700 once the values from N/2 bit high timestamp 704 and N/2 bit low timestamp 706 are written to timebase counter 710 on system bootup. In one embodiment, N/2 bit high timestamp 704 and N/2 bit low timestamp 706 may be retrieved from a system master clock on system bootup or on reset.

A delay offset value 715 may be added to the output of counter 710 to generate global timer value 720. Global timer value 720 may be used for comparing timestamp values from a timestamp queue in the display control unit. Delay offset value 715 may be equal to the delay in fetching a frame configuration set, applying updates to the display control unit from the frame configuration set, and processing the source pixel data. In one embodiment, delay offset value 715 may be programmed by software. In another embodiment, delay offset value 715 may be a hard-coded value.

Figure 8:
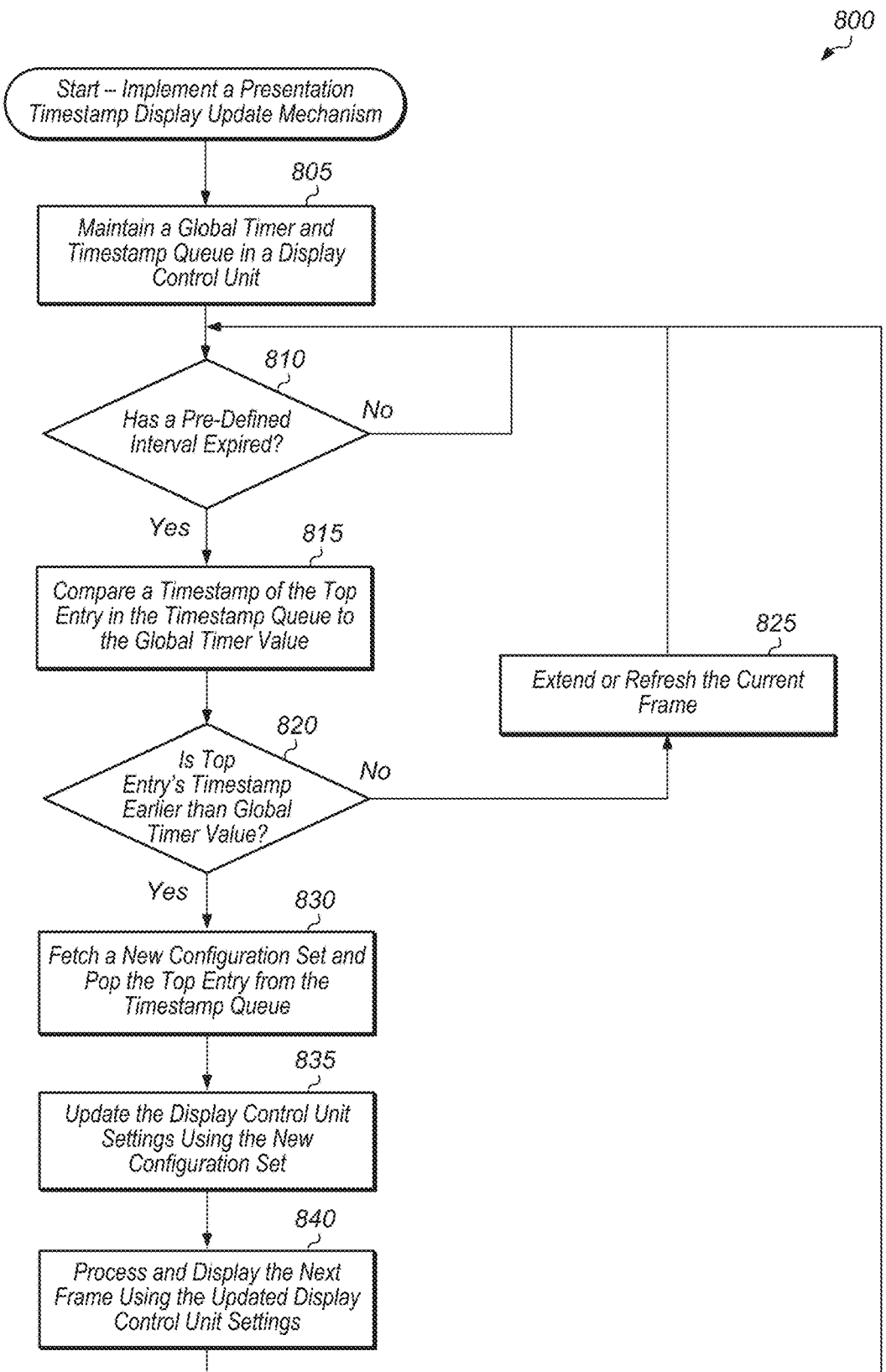
FIG. 8 is a generalized flow diagram illustrating one embodiment of a method for implementing a presentation timestamp display update mechanism.

Turning now to FIG. 8, one embodiment of a method 800 for implementing a presentation timestamp display update mechanism is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display control units described herein may be configured to implement method 800.

A display control unit of a host apparatus may maintain a global timer and a timestamp queue for storing timestamps for comparison to the global timer (block 805). Each timestamp may correspond to a given destination frame and indicate the desired presentation time of the given destination frame. The display control unit may be coupled to a memory and one or more processors (via a communication fabric), and the display control unit may be coupled to a display (via a display interface). Depending on the embodiment, the host apparatus may be a mobile device (e.g., tablet, smartphone), wearable device, computer, computing system, or other computing device.

Next, the display control unit may determine if a pre-defined interval has expired (conditional block 810). In one embodiment, a processor of the display control unit may be configured to wake-up once every pre-defined interval to perform a timestamp comparison. If the pre-defined interval has expired (conditional block 810, "yes" leg), then the display control unit may compare the timestamp of the top entry in the timestamp queue to a global timer value (block 815). An offset value may be added to the global timer to account for the delay in fetching the configuration set, updating the display settings, and fetching and processing the pixels. Adding the offset value to the global timer ensures a given destination frame is displayed at the desired time. This offset value may be pre-determined in some embodiments. In other embodiments, the offset value may be programmable and may be adjusted depending on the current operating conditions of the apparatus and/or display control unit. The term "global timer value" may be defined as the sum of the global timer and the offset value. If the pre-defined interval has not expired (conditional block 810, "no" leg), then method 800 may remain at conditional block 810.

If the timestamp of the top entry of the timestamp queue is later than the global timer value (conditional block 820, "no" leg), then the display control unit may extend or refresh the current frame (block 825) and then method 800 may return to conditional block 810. If the timestamp of the top entry of the timestamp queue is earlier than the global timer value (conditional block 820, "yes" leg), then the display control unit may fetch a new configuration set and pop the top entry from the timestamp queue (block 830). In one embodiment, the display control unit may fetch the configuration set at the address stored in the popped entry and store the configuration set in the shadow registers. Next, the display control unit settings may be updated using the new configuration set (block 835). Then, the next frame may be processed and displayed using the updated display control unit settings (block 840). After block 840, method 800 may return to block 810 to determine if the pre-defined interval has expired. It is noted that the completion of each of steps 820 ("yes" leg), 830, and 835 may trigger the launching of steps 830, 835, and 840, respectively. In this way, the comparison of the timestamp at the top of the timestamp queue may dictate the timing of the driving of frame data to the display.

Figure 9:
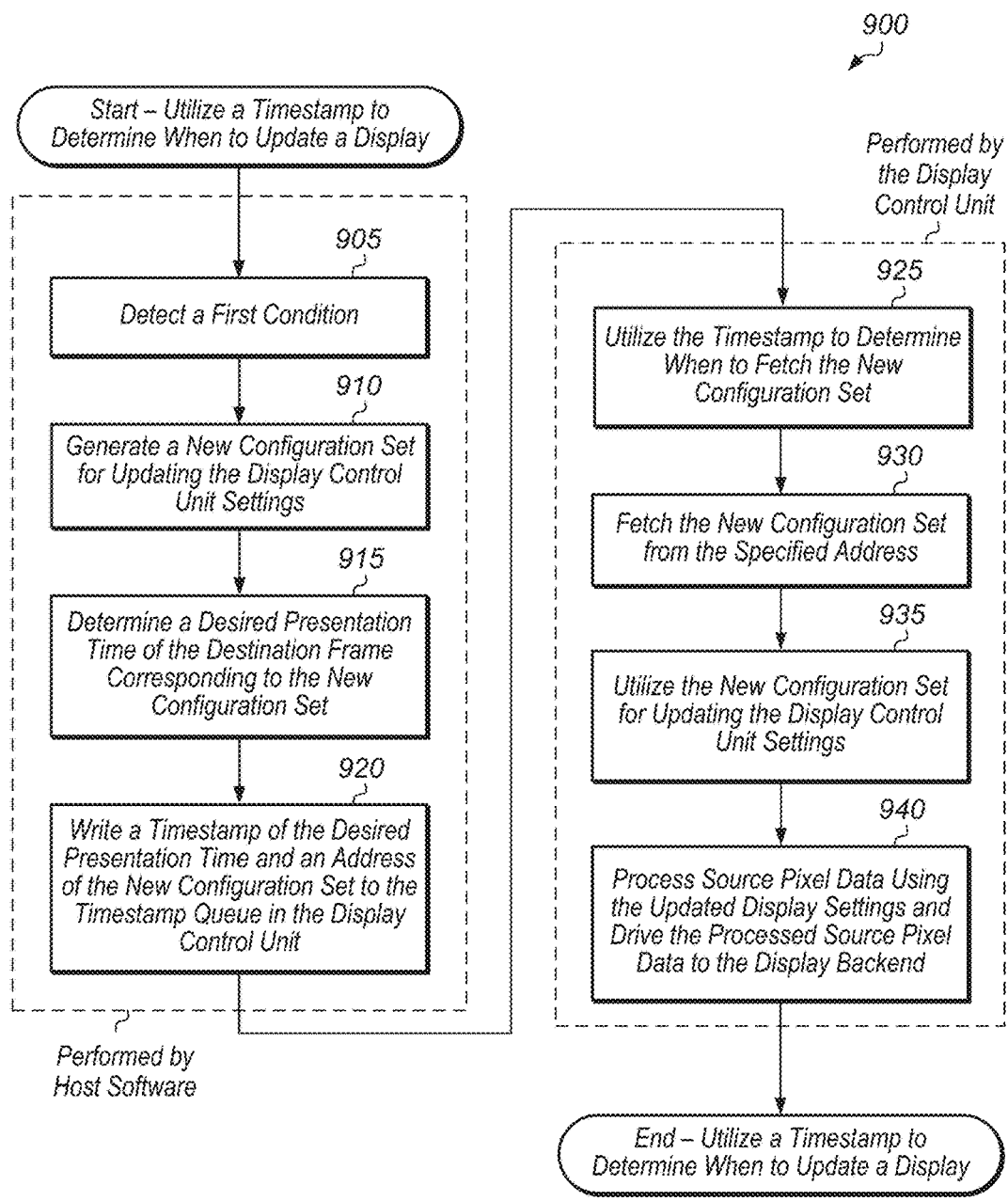
FIG. 9 is a generalized flow diagram illustrating one embodiment of a method for generating timestamps for updating the display.

Referring now to FIG. 9, one embodiment of a method 900 for utilizing a timestamp to determine when to update a display is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display control units described herein may be configured to implement method 900.

Software executing on one or more host processors of an apparatus may detect a first condition (block 905). In various embodiments, the first condition may be a detected touch event or other user action, an updated brightness setting, an incoming email, message, or social media update, a request to display a new destination frame, or other event. In response to detecting the first condition, software may generate a new configuration set for updating the display control unit settings (block 910). The software may also determine a desired presentation time of the destination frame corresponding to the new configuration set (block 915). For example, if a movie is being displayed at 24 frames per second (fps), and the destination frame is the next frame in the movie, the desired presentation time may be 41.67 ms after the current frame. Alternatively, if a movie is being displayed at 60 fps, the desired presentation time of the destination frame may be 16.67 ms after the current frame. In one embodiment, the software may track the presentation time of the current frame and add an offset to the presentation time of the current frame to calculate the desired presentation time of the next frame. In cases where a user action has been detected and the destination frame should be displayed immediately, a timestamp of zero may be generated.

Next, the software may write a timestamp of the desired presentation time and an address of the new configuration set to an entry of the timestamp queue in the display control unit (block 920). The display control unit may utilize the timestamp to determine when to fetch the new configuration set (block 925). Also, the display control unit may fetch the new configuration set from the specified address (block 930). Then, the display control unit may utilize the new configuration set for updating the display control unit settings (block 935). Next, the display control unit may process source pixel data using the updated display settings and drive the processed source pixel data to the display backend (block 940). After block 940, method 900 may end. It is noted that in one embodiment, blocks 905-920 may be performed by host software executing on one or more host processors and blocks 925-940 may be performed by a display control unit (e.g., display control unit 300 of FIG. 3).

Figure 10:
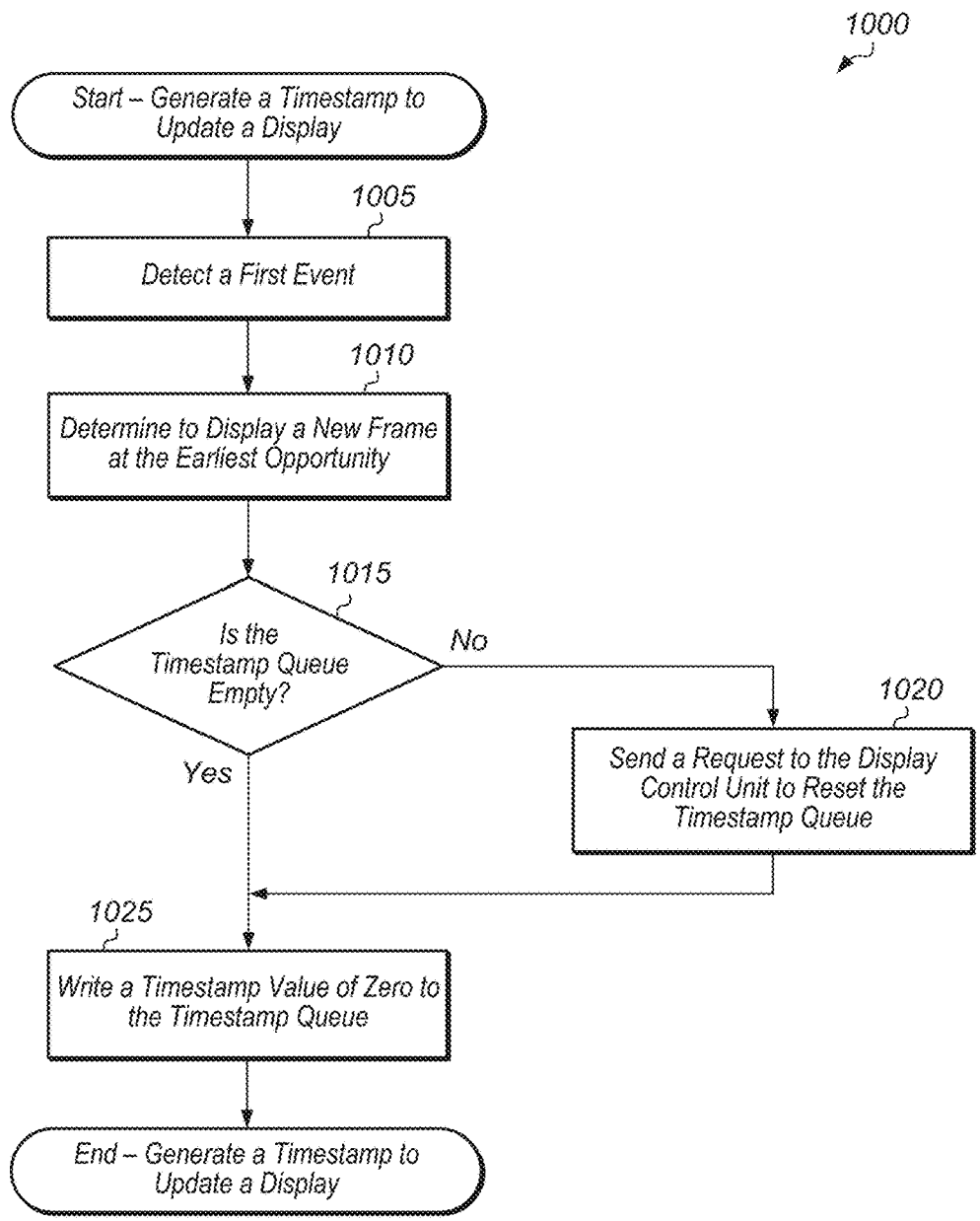
FIG. 10 is a generalized flow diagram illustrating one embodiment of a method for generating a timestamp to update a display.

Referring now to FIG. 10, one embodiment of a method 1000 for generating a timestamp to update a display is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1000.

Software executing on one or more host processors of a system or apparatus with a display may detect a first event (block 1005). The software may be user interface software, an application running on the system, a display driver, or other software. Depending on the embodiment, the first event may be the detection of a touch event, the user interface generating a request to display a frame, the detection of a user scrolling on the screen, a received message, or another event. In response to detecting the first event, the software may determine to display a new frame at the earliest opportunity (block 1010).

Next, the software may determine if the timestamp queue in the display control unit is empty (conditional block 1015). In one embodiment, a flag may be set when the timestamp queue is empty, and the software may query the flag in conditional block 1015. If the timestamp queue is empty (conditional block 1015, "yes" leg), then the software may write a timestamp value of zero to the timestamp queue (block 1025). In some embodiments, the software may also prepare a new frame configuration set and send an address of the new frame configuration set to the display control unit. The display control unit may store the address of the new frame configuration set in the timestamp queue entry with the timestamp value of zero. If the timestamp queue is not empty (conditional block 1015, "no" leg), then the software may send a request to the display control unit to reset the timestamp queue (block 1020). Next, the software may send a timestamp value of zero to the timestamp queue (block 1025). After block 1025, method 1000 may end. In response to receiving a timestamp value of zero in the timestamp queue, the display control unit may fetch a new configuration set corresponding to the new frame and process and display the new frame at the earliest possible opportunity.

Figure 11:
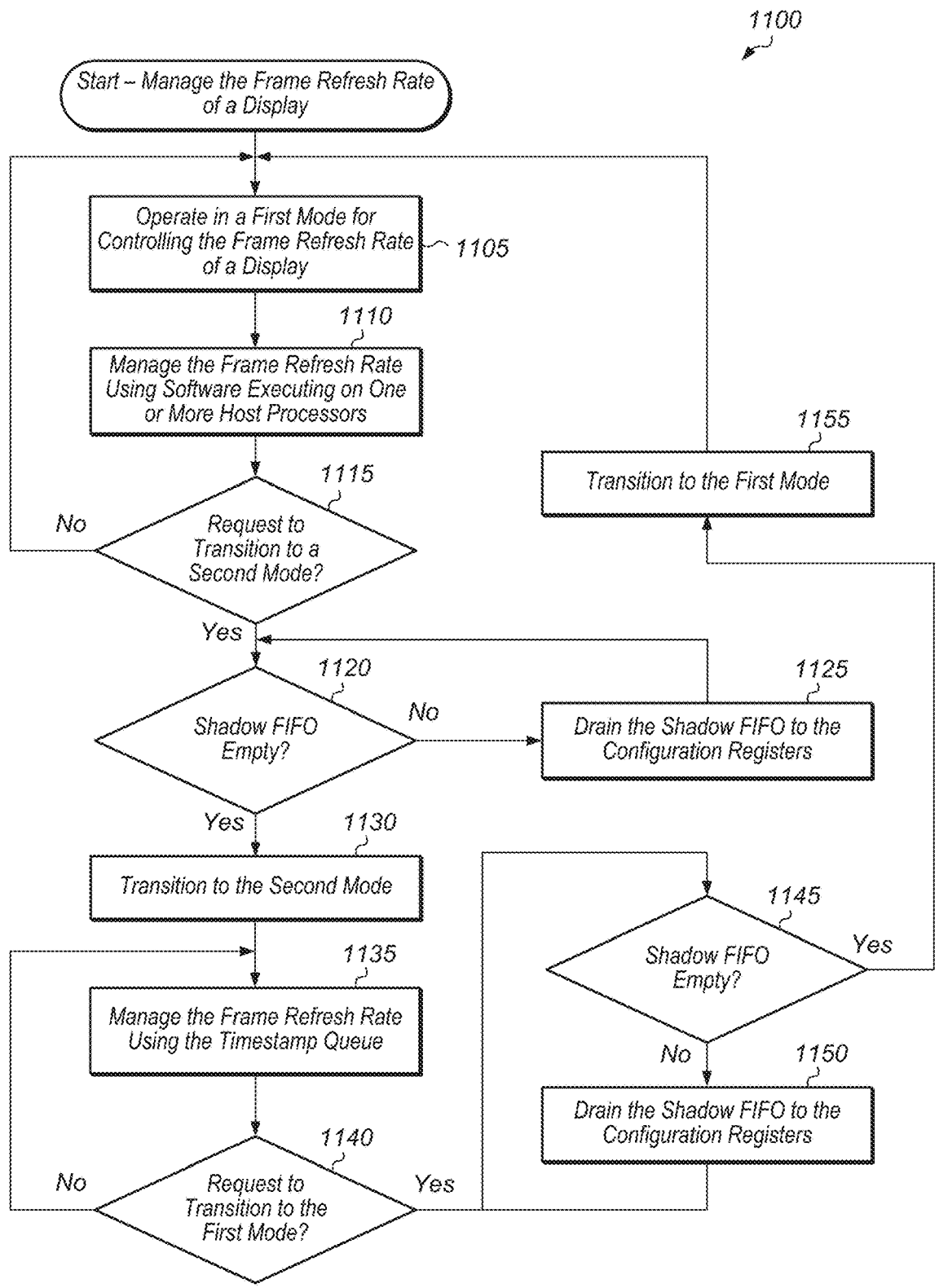
FIG. 11 is a generalized flow diagram illustrating one embodiment of a method for transitioning between operating modes.

Referring now to FIG. 11, one embodiment of a method 1100 for transitioning between operating modes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display control units described herein may be configured to implement method 1100.

An apparatus may operate in a first mode for controlling the frame refresh rate of a display (block 1105). While operating in the first mode, software executing on one or more host processors of the apparatus may manage the frame refresh rate (block 1110). In one embodiment, a display driver may manage the frame refresh rate of frames being driven to the display without the use of a timestamp queue in the display control unit. In some embodiments, the apparatus may operate in the first mode during bootup. Next, the software may determine if a request to transition to a second mode for controlling the frame refresh rate of the display has been detected (conditional block 1115). In some embodiments, a request to transition to the second mode may be generated after the apparatus has booted up.

If a request to transition to the second mode has been detected (conditional block 1115, "yes" leg), then the software may determine if the shadow FIFO in the display control unit is empty (conditional block 1120). If a request to transition to the second mode has not been detected (conditional block 1115, "no" leg), then method 1100 may return to block 1105 with the apparatus continuing to operate in the first mode. If the shadow FIFO in the display control unit is not empty (conditional block 1120, "no" leg), then the shadow FIFO may be drained to the configuration registers (block 1125). If the shadow FIFO in the display control unit is empty (conditional block 1120, "yes" leg), then the apparatus may transition from the first mode into the second mode (block 1130). While operating in the second mode, a processor in the display control unit may manage the frame refresh rate using a timestamp queue (block 1135). Next, the apparatus may determine if a request to transition to the first mode has been detected (conditional block 1140). In some embodiments, a request to transition to the first mode may be generated when the apparatus is shutting down. Alternatively, in other embodiments, the apparatus may continue to operate in the first mode until a request to transition to the second mode is detected. In some cases, the apparatus may operate in the first mode when the display is being driven at a constant frame refresh rate. The apparatus may transition to the second mode when the display will be driven at a variable frame refresh rate.

If a request to transition to the first mode has been detected (conditional block 1140, "yes" leg), then the software may determine if the shadow FIFO in the display control unit is empty (conditional block 1145). If a request to transition to the second mode has not been detected (conditional block 1140, "no" leg), then method 1100 may return to block 1135 with the apparatus continuing to operate in the second mode. If the shadow FIFO in the display control unit is not empty (conditional block 1145, "no" leg), then the shadow FIFO may be drained to the configuration registers (block 1150). If the shadow FIFO in the display control unit is empty (conditional block 1145, "yes" leg), then the apparatus may transition from the second mode into the first mode (block 1155). After block 1155, method 1100 may return to block 1105.

Figure 12:
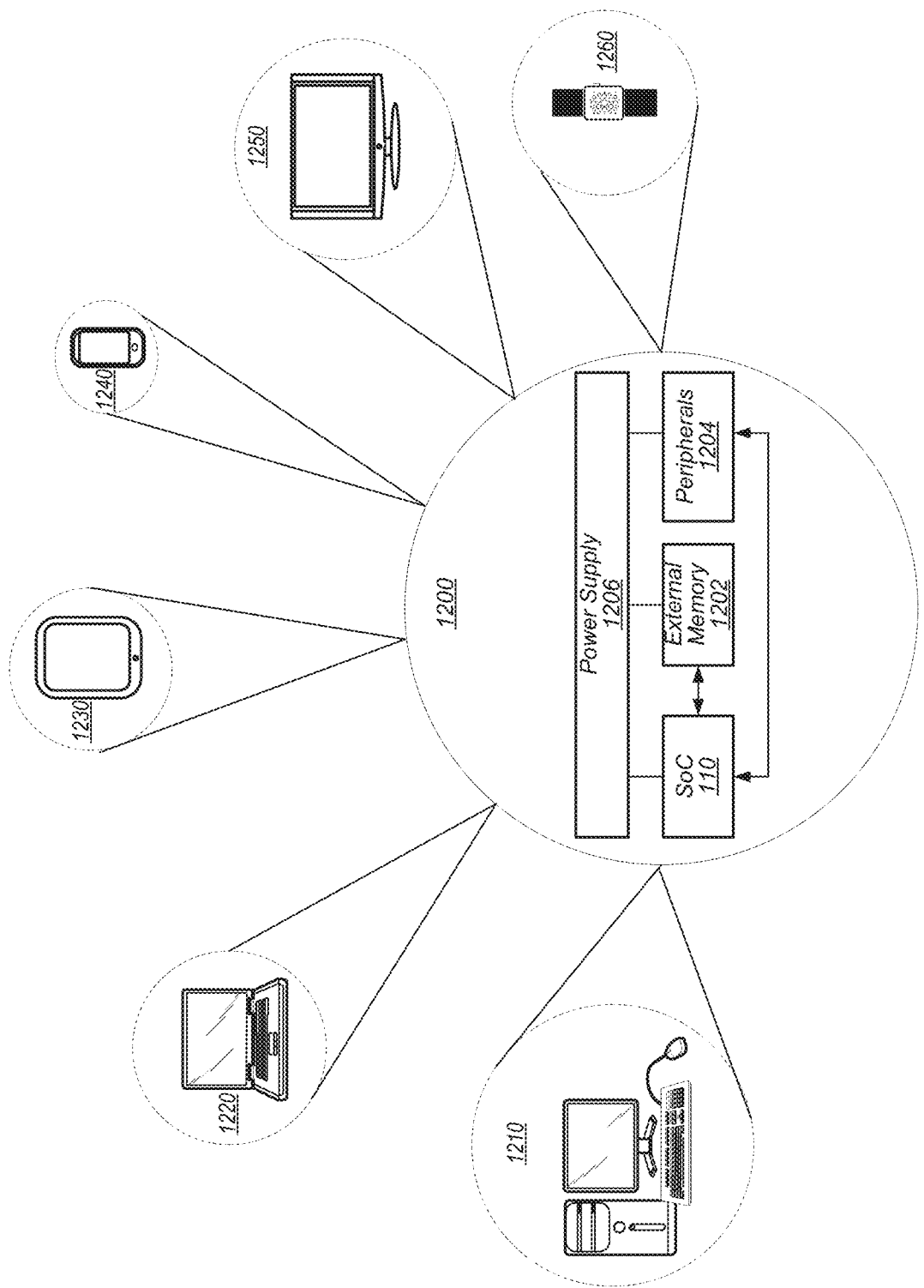
FIG. 12 is a block diagram of one embodiment of a system.

Turning next to FIG. 12, a block diagram of one embodiment of a system 1200 is shown. As shown, system 1200 may represent chip, circuitry, components, etc., of a desktop computer 1210, laptop computer 1220, tablet computer 1230, cell phone 1240, television 1250 (or set top box configured to be coupled to a television), wrist watch or other wearable item 1260, or otherwise. Other devices are possible and are contemplated. In the illustrated embodiment, the system 1200 includes at least one instance of SoC 110 (of FIG. 1) coupled to an external memory 1202.

SoC 110 is coupled to one or more peripherals 1204 and the external memory 1202. A power supply 1206 is also provided which supplies the supply voltages to SoC 110 as well as one or more supply voltages to the memory 1202 and/or the peripherals 1204. In various embodiments, power supply 1206 may represent a battery (e.g., a rechargeable battery in a smart phone, laptop or tablet computer). In some embodiments, more than one instance of SoC 110 may be included (and more than one external memory 1202 may be included as well).

The memory 1202 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1204 may include any desired circuitry, depending on the type of system 1200. For example, in one embodiment, peripherals 1204 may include devices for various types of wireless communication, such as wifi, Bluetooth, cellular, global positioning system, etc. The peripherals 1204 may also include additional storage, including RAM storage, solid state storage, or disk storage. The peripherals 1204 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A display control unit comprising:
   circuitry including a timestamp queue comprising a plurality of entries, wherein each of said entries is configured to store a timestamp; and
   circuitry configured to:
      compare a timestamp in a top entry of the timestamp queue to a global timer value;
      in response to determining the timestamp in the top entry of the timestamp queue is later than the global timer value, extend or refresh a current frame;
      in response to determining the timestamp in the top entry of the timestamp queue matches or is earlier than the global timer value:
         retrieve the timestamp from the top entry of the timestamp queue;
         fetch a new frame configuration set corresponding to a new frame to be displayed based on the timestamp retrieved from the top entry of the timestamp queue; and
         utilize the configuration set to update one or more display settings for processing and displaying source pixel data corresponding to the new frame.

2. The display control unit as recited in claim 1, wherein the display control unit is further configured to receive a timestamp and an address of an associated frame configuration set, and store the received timestamp and address of the associated frame configuration set in the timestamp queue.

3. The display control unit as recited in claim 1, wherein each entry of the timestamp queue is further configured to store an address associated with each timestamp stored in the timestamp queue, wherein each address identifies a location in memory of a frame configuration set.

4. The display control unit as recited in claim 3, wherein in response to determining the timestamp in the top entry of the timestamp queue is earlier than the global timer value, a location of the new frame configuration set is identified by an address stored in the top entry of the timestamp queue.

5. The display control unit as recited in claim 1, wherein the display control unit is further configured to compare a timestamp in a top entry of the timestamp queue to a global timer value every pre-defined interval.

6. The display control unit as recited in claim 5, wherein the pre-defined interval is set to be less than or equal to half of a frame duration based on a maximum frame refresh rate.

7. The display control unit as recited in claim 1, wherein responsive to determining the timestamp queue is empty, the display control unit is configured to extend or refresh a current frame.

8. A computing system comprising:
   a display device; and
   a display control unit comprising:
      circuitry including a timestamp queue comprising a plurality of entries, wherein each of said entries is configured to store a timestamp; and
      circuitry configured to:
         compare a timestamp in a top entry of the timestamp queue to a global timer value;
         in response to determining the timestamp in the top entry of the timestamp queue is later than the global timer value, extend or refresh a frame currently driven to the display device;
         in response to determining the timestamp in the top entry of the timestamp queue matches or is earlier than the global timer value:
            retrieve the timestamp from the top entry of the timestamp queue;
            fetch a new frame configuration set corresponding to a new frame to be displayed based on the timestamp retrieved from the top entry of the timestamp queue; and
            utilize the configuration set to update one or more display settings for processing and displaying source pixel data corresponding to the new frame on the display device.

9. The computing system as recited in claim 8, the display control unit is further configured to receive a timestamp and an address of an associated frame configuration set, and store the received timestamp and address of the associated frame configuration set in the timestamp queue.

10. The computing system as recited in claim 8, wherein each entry of the timestamp queue is further configured to store an address associated with each timestamp stored in the timestamp queue, wherein each address identifies a location in memory of a frame configuration set.

11. The computing system as recited in claim 10, wherein in response to determining the timestamp in the top entry of the timestamp queue is earlier than the global timer value, a location of the new frame configuration set is identified by an address stored in the top entry of the timestamp queue.

12. The computing system as recited in claim 8, wherein the display control unit is further configured to compare a timestamp in a top entry of the timestamp queue to a global timer value every pre-defined interval.

13. The computing system as recited in claim 12, wherein the pre-defined interval is set to be less than or equal to half of a frame duration based on a maximum frame refresh rate.

14. The computing system as recited in claim 8, wherein responsive to determining the timestamp queue is empty, the display control unit is configured to extend or refresh a current frame.

15. A method comprising:
   maintaining, by circuitry including a timestamp queue, a plurality of entries each configured to store a timestamp; and
   comparing, by circuitry, a timestamp in a top entry of the timestamp queue to a global timer value;
   extending or refreshing a current frame, in response to determining the timestamp in the top entry of the timestamp queue is later than the global timer value;
   retrieving the timestamp from the top entry of the timestamp queue, in response to determining the timestamp in the top entry of the timestamp queue matches or is earlier than the global timer value;
   fetching a new frame configuration set corresponding to a new frame to be displayed based on the timestamp retrieved from the top entry of the timestamp queue; and
   utilizing the configuration set to update one or more display settings for processing and displaying source pixel data corresponding to the new frame.

16. The method as recited in claim 15, further comprising receiving a timestamp and an address of an associated frame configuration set, and store the received timestamp and address of the associated frame configuration set in the timestamp queue.

17. The method as recited in claim 15, further comprising receiving and storing an address with each timestamp, wherein the address identifies a location in memory of the frame configuration set.

18. The method as recited in claim 17, wherein in response to determining the timestamp in the top entry of the timestamp queue is earlier than the global timer value, identifying a location of the new frame configuration set by an address stored in the top entry of the timestamp queue.

19. The method as recited in claim 15, further comprising comparing a timestamp in a top entry of the timestamp queue to a global timer value every pre-defined interval.

20. The method as recited in claim 19, wherein the pre-defined interval is set to be less than or equal to half of a frame duration based on a maximum frame refresh rate.

* * * * *